United States Patent [19]

Bruestle

[11] Patent Number: 5,143,031
[45] Date of Patent: Sep. 1, 1992

[54] PROCESS AND AN ARRANGEMENT FOR INFLUENCING THE TIMING PERIODS OF AN INTERNAL-COMBUSTION ENGINE

[75] Inventor: Claus Bruestle, Heimsheim, Fed. Rep. of Germany

[73] Assignee: Dr. Ing. h.c.F. Porsche AG, Fed. Rep. of Germany

[21] Appl. No.: 689,471

[22] Filed: Apr. 23, 1991

[30] Foreign Application Priority Data

May 4, 1990 [DE] Fed. Rep. of Germany ....... 4014401

[51] Int. Cl.⁵ .......................... F01L 1/34; F02D 13/02
[52] U.S. Cl. ................................ 123/90.16; 123/90.17
[58] Field of Search ............... 123/90.15, 90.16, 90.17

[56] References Cited

U.S. PATENT DOCUMENTS

| | | | |
|---|---|---|---|
| 4,498,431 | 2/1985 | Nakamura et al. | 123/90.17 |
| 4,856,465 | 8/1989 | Denz | 123/90.17 |
| 4,887,561 | 12/1989 | Kishi | 123/90.16 |
| 4,899,701 | 2/1990 | Inoue et al. | 123/90.16 |
| 4,926,823 | 5/1990 | Kishi et al. | 123/90.16 |
| 5,042,436 | 8/1991 | Yamamoto et al. | 123/90.16 |
| 5,046,461 | 9/1991 | Kanehiro et al. | 123/90.16 |
| 5,080,055 | 1/1992 | Komatsu et al. | 123/90.17 |

FOREIGN PATENT DOCUMENTS 0338729 4/1989 European Pat. Off.
3421028 12/1985 Fed. Rep. of Germany.
3832294 4/1989 Fed. Rep. of Germany.

OTHER PUBLICATIONS

MTZ Motor Technischezeitschriftso (1989) p. 4.

Primary Examiner—E. Rollins Cross
Assistant Examiner—Weilun Lo
Attorney, Agent, or Firm—Evenson, Wands, Edwards, Lenahan and McKeown

[57] ABSTRACT

An arrangement and process for displacing the normally static, fixed rotational shifting speed of an internal-combustion engine in which the timing periods are changed in the form of a valve crossover between the intake valve and the exhaust valve, as a function of the dynamics of the acceleration operation, by a dynamics-dependent rotational differential speed. As a result, the process minimizes the mismatching between the rotational speed of the internal-combustion engine and the possible torque which occurs as a result of a time interval required for influencing the timing periods.

24 Claims, 3 Drawing Sheets

PROCESS AND AN ARRANGEMENT FOR INFLUENCING THE TIMING PERIODS OF AN INTERNAL-COMBUSTION ENGINE

BACKGROUND AND SUMMARY OF THE INVENTION

The present invention relates to a process and an arrangement for influencing the timing periods of an internal-combustion engine that has at least one intake valve and one exhaust valve used for a charge cycle, with the timing of the intake valve with respect to the exhaust valve being changeable by means of a shifting element controlled by an electronic control unit for at least one rotational shifting speed stored in the control unit.

From the German Patent Document DE 34 21 028, an arrangement is known for influencing the timing periods of an internal-combustion engine with two camshafts in such a manner that the first camshaft changes its rotating position relative to the second camshaft. Such an arrangement changes the crossover time of the intake valves with respect to the exhaust valves and can therefore influence the course of the torque, the exhaust emissions, the power and the idling characteristics of an internal-combustion engine.

Normally, the adjustment of the camshaft as a function of the engine load and the rotational speed of the engine takes place such that, at least at a fixed rotational shifting speed of the internal-combustion engine, a shifting element is actuated which turns the intake camshaft with respect to the exhaust camshaft in such a manner that a shifting takes place from a small to a large valve crossover or vice versa, as known, for example, from the journal *Motortechnische Zeitschrift* MTZ 50 (1989), No. 4, Page 142.

Irrespective of how the timing periods are influenced, for example, by means of the turning of camshafts or by means of the connecting or disconnecting of charge cycle control valves, and whether this influencing is implemented electrically, hydraulically, mechanically, etc., a specific time interval is required in order to exercise this influence. In the case of the typical hydraulically or electrohydraulically operating arrangements, the length of this time interval is a function of the oil temperature and the oil pressure, with the oil pressure in turn being a function of the rotational speed.

The rotational shifting speed is normally placed in the intersecting point of the torque curves pertaining to the different timing periods so that, when the course of the torque pertaining, for example, to an early timing period falls, shifting takes place to the more advantageous course of the torque which pertains to a later timing period.

In any case, during the time interval which is required for the influencing of the timing periods, a mismatching takes place between the rotational speed of the engine and the possible torque occurring in the form of a torque break since this torque is not reached before the end of the time interval. The mismatching becomes larger with more dynamic driving through this nonoptimal rotational shifting speed.

An object of the present invention is to provide a process for influencing the timing periods of an internal-combustion engine which avoids the above-mentioned disadvantages and ensures an optimal course of the torque in all rotational speed ranges.

This and other objects are achieved by the present invention which provides a process for influencing the timing periods of an internal-combustion engine that has at least one intake valve and one exhaust valve used for a charge cycle, with the timing the intake valve with respect to the exhaust valve being changeable by means of a shifting element controlled by an electronic control unit for at least one rotational shifting speed stored in the control unit. The process includes the step of displacing the rotational shifting speed to the value of an optimal rotational shifting speed that results in an optimal torque. This displacing is performed as a function of the time variation of the rotational speed of the internal-combustion engine by a rotational differential speed stored in at least one characteristic diagram of the control unit.

The process according to embodiments of the present invention advantageously avoids the torque break which occurs as a result of the time interval required for the influencing of the timing periods in which, as a function of the dynamics by which the rotational speed of the engine rises, the rotational shifting speed is displaced by a rotational differential speed to a value of an optimal rotational shifting speed. The value of this rotational differential speed, which depends with respect to time from the increase of the rotational engine speed, is stored in a characteristic diagram of a control unit of the internal-combustion engine. Since the time interval required for the turning operation is essentially constant, in an embodiment of the process of the present invention, the optimal rotational shifting speed is displaced farther in front of the fixed rotational shifting speed as the rotational engine speed more dynamically rises. In the practical driving operation of a motor vehicle equipped with an internal-combustion engine operating according to this process, this means that, for high acceleration operations, particularly in low driving positions of the transmission, the influencing of the timing periods is initiated so early that only a very slight mismatching occurs between the torque curves for the different timing periods which is clearly smaller than the mismatching in the case of a purely statically fixed rotational shifting speed.

The amount by which the fixed rotational shifting speed is advanced is determined in a simple manner on a dynamic engine test bed and is subsequently stored in a characteristic diagram of the already existing conventional electronic control unit of the internal-combustion engine.

This characteristic diagram comprises at least one characteristic curve for the full-load operation when the internal-combustion engine is in a hot-running condition and one characteristic curve for the operation at a lower engine oil temperature.

For a further improvement of the process, several characteristic diagrams may be stored in a memory file in the control unit in order to assign optimal rotational differential speeds, for example, to each individual driving position of the transmission. Furthermore, groups of rotational shifting speeds may be assigned to each characteristic diagram in order to, for example, at a low rotational speed, shift from a low to a high valve crossover, and vice versa in the case of a higher rotational speed.

As a function of the position of a driving program switch to be actuated manually which may also affect the transmission, in a further development, a shifting speed, which is optimal for the respective selected driving program, may be selected from a list of rotational shifting speeds or groups of rotational shifting speeds stored in the control unit.

The process of the present invention is suitable for any type of internal-combustion engine whose charge cycle is controlled by intake and exhaust valves.

The present invention also relates to an arrangement for influencing the timing periods of an internal-combustion engine that has at least one intake valve and one exhaust valve used for a charge cycle, and comprises an electronic control unit having at least one rotational speed stored in the control unit and a shifting element controlled by the electronic control unit that changes the timing of the intake valve with respect to the exhaust valve for the at least one rotational shifting speed stored in the control unit. There are means for displacing the rotational shifting speed to the value of an optimal rotational shifting speed that results in an optimal torque. The means for displacing operates to displace the rotational shifting speed as a function of the time variation of the rotational speed of the internal-combustion engine by a rotational differential speed stored in at least one characteristic diagram of the control unit. There are camshafts assigned to the intake and exhaust valves of the internal-combustion engine, and the shifting element is arranged coaxially adjacent to one of the camshafts.

Other objects, advantages and novel features of the present invention will become apparent from the following detailed description of the invention when considered in conjunction with the accompanying drawings.

DETAILED DESCRIPTION OF THE DRAWINGS

Figure 5:
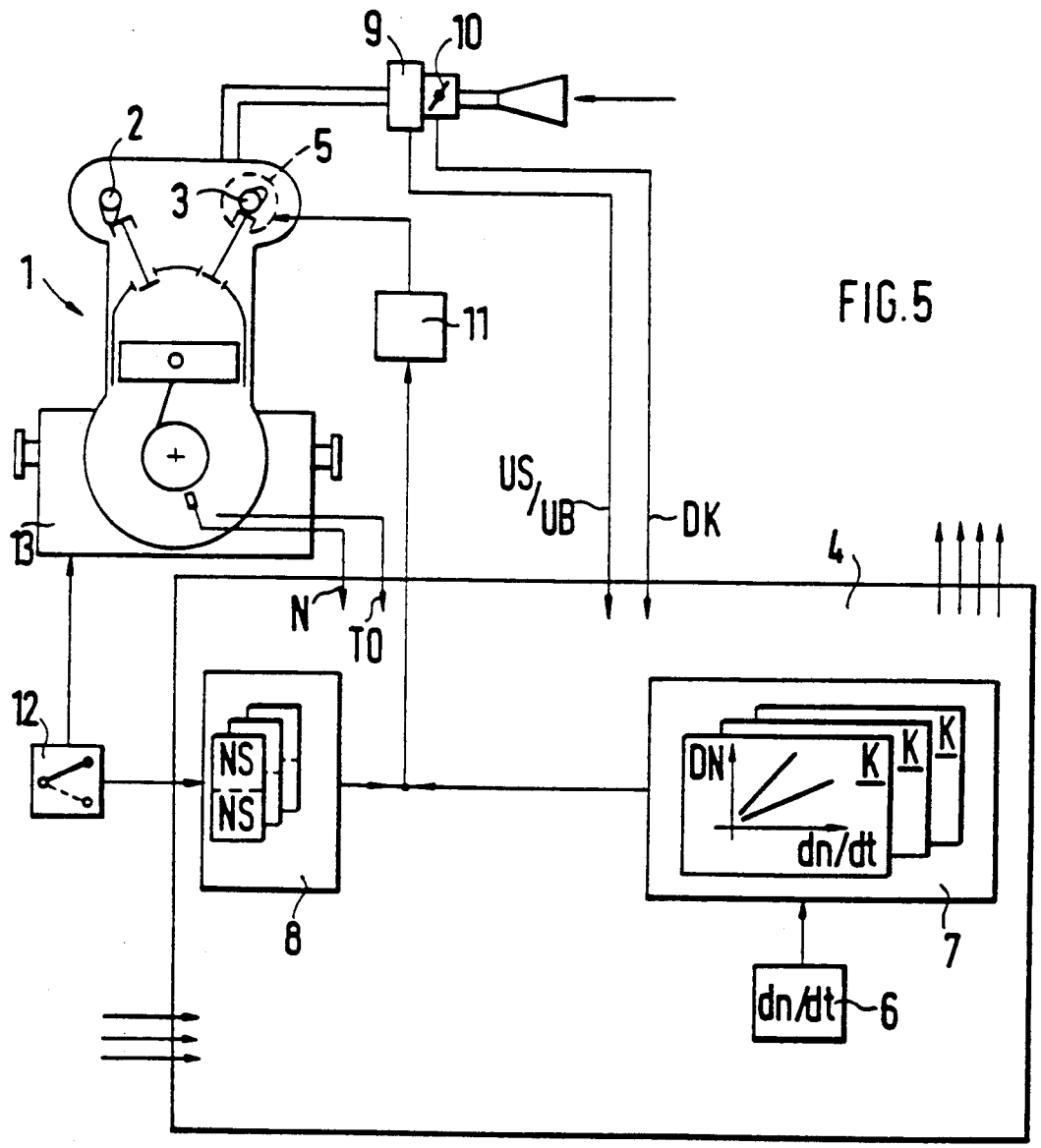
FIG. 5 is a schematic representation of an arrangement constructed according to an embodiment of the present invention for carrying out the process of the invention.

An internal-combustion engine 1 of a motor vehicle shown in FIG. 5 has a camshaft 3 which acts upon intake valves and which can be changed in its rotating position relative to a camshaft 2 that affects exhaust valves. A hydraulic shifting element 5 is controlled by an electronic control unit 4 and is connected to the engine oil circuit. The hydraulic shifting element 5 turns the camshaft 3, as a result of a shifting signal emitted by the control unit 4, from an early intake position into a late intake position. The valve crossover between the intake valves and the exhaust valves is thus reduced.

Figure 1:
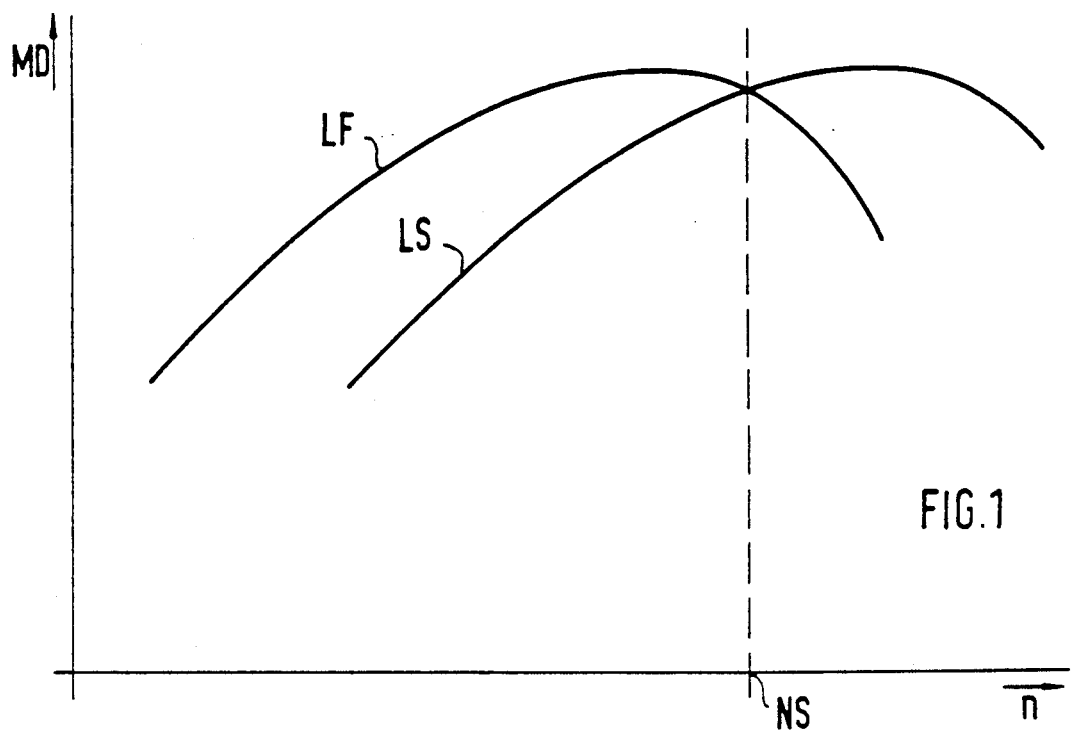
FIG. 1 is an idealized torque / rotational-speed diagram of a known internal-combustion engine.

The torque curves of the internal-combustion engine 1 which occur for these two intake positions are shown as full-load lines in FIG. 1 for a known internal-combustion engine. The internal-combustion engine torque MD is on the vertical axis, while the rotational speed n of the internal-combustion engine is on the horizontal axis. A rotational shifting speed NS is stored in the control unit 4. Below this rotational shifting speed NS, the internal-combustion engine 1 is operated according to the line LF in the early intake position; above the rotational shifting speed NS, the engine 1 is operated according to the Line LS in the late intake position.

The diagram according to FIG. 1 is idealized in that the turning operation takes place in an infinitely small time interval. Actually, the control element requires a finite, almost constant time interval DT in order to implement the turning operation. Since the control signal, which triggers the turning operation, is not triggered before the rotational shifting speed NS is reached, the late intake position is reached only above this rotational speed NS.

Figure 2:
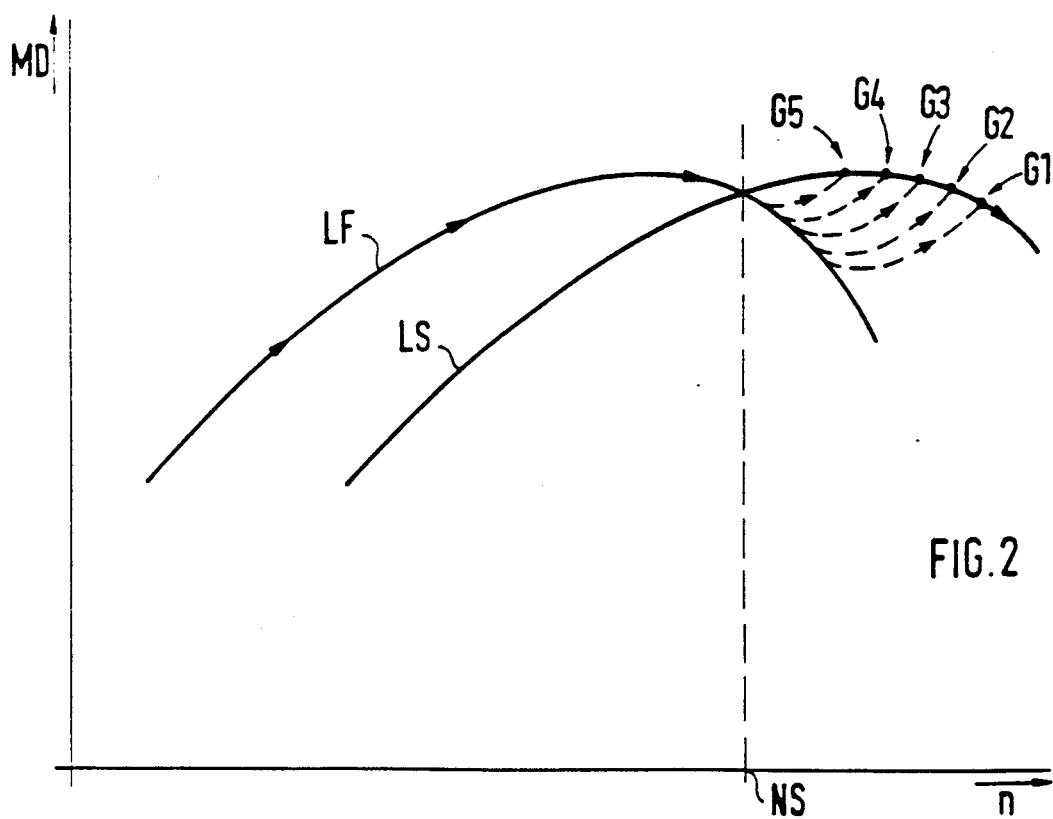
FIG. 2 is a real torque / rotational-speed diagram of a known internal-combustion engine.

FIG. 2 illustrates the actual course of the torque indicated by arrows along the curves LF and LS for the different forward driving positions of the first to the fifth gear G1 to G5. The mismatching between the rotational speed n and the theoretically possible torque MD above the rotational speed NS, which occurs in the form of torque breaks, is clearly visible. This effect is particularly disadvantageous in the low driving positions since here the rotational speed n increases faster, and the achieved torque MD corresponds for a comparatively long time to the already falling curve LF.

Figure 4:
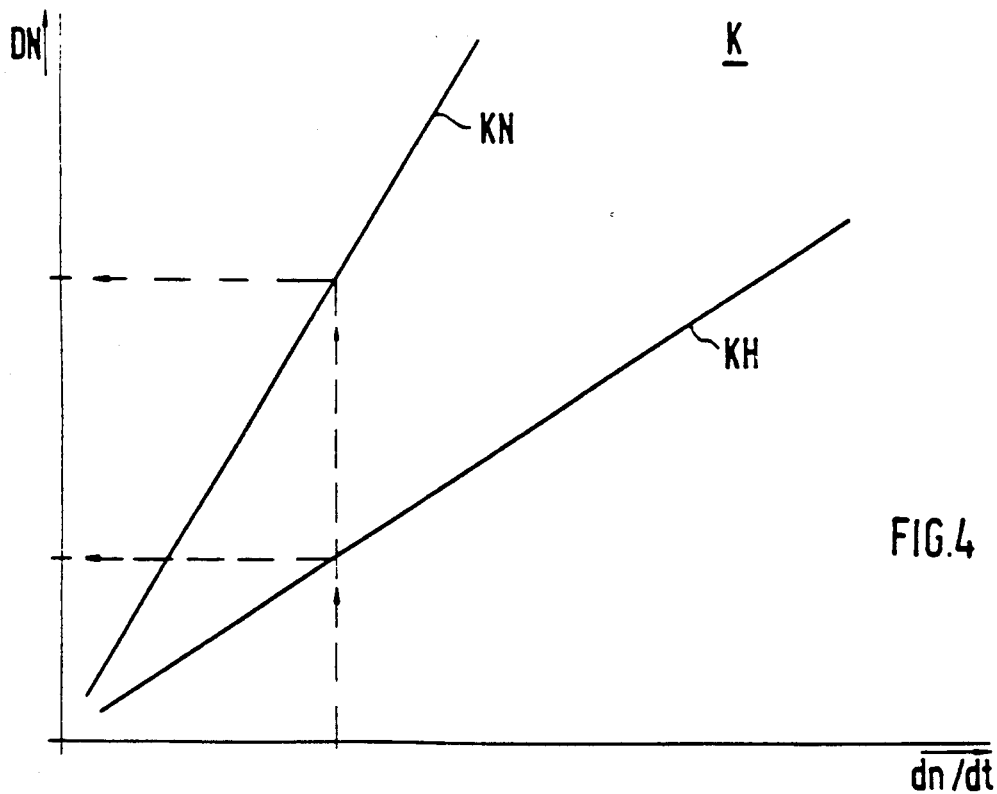
FIG. 4 is a characteristic diagram of an internal-combustion engine according to FIG. 3 stored in a control unit.

In order to eliminate this defect, at least one characteristic diagram K according to FIG. 4 is stored in the control unit 4. There, rotational differential speeds DN are entered on the vertical axis as a function of the time variation dt of the rotational speed n in the form $DN = k \cdot dn/dt$ with k = constant. The characteristic diagram K contains a characteristic curve KH for the full-load operation of the hot-running internal-combustion engine and a characteristic curve KN for the operation of the internal-combustion engine 1 at a low engine oil temperature TO.

A differentiator 6 contained in the control unit 4 continuously forms an up-to-date quotient dn/dt to which a specified rotational differential speed DN is assigned by way of the characteristic curves KH or KN. The value for DN, which is read out of the characteristic diagram K, in the control unit 4, is overlaid on the rotational shifting speed NS in such a manner that the rotational speed NS, as a function of the dynamics of the acceleration operation, is advanced to an optimal rotational shifting speed NO. In other words, the shifting signal coming from the control unit 4 is triggered earlier.

Figure 3:
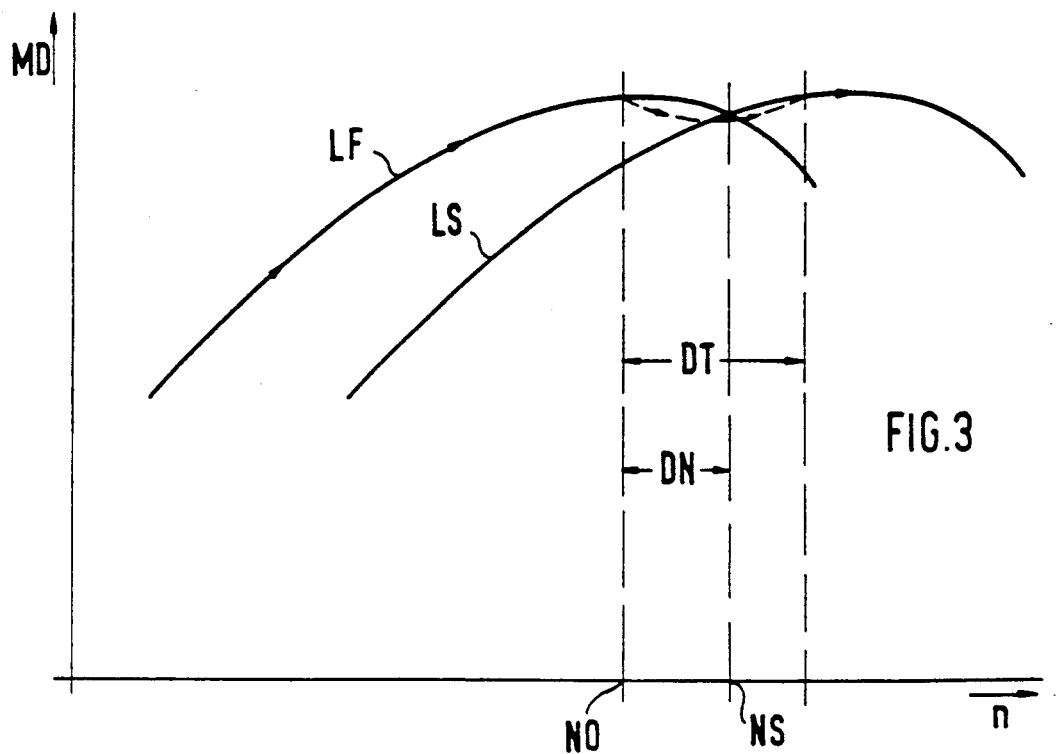
FIG. 3 is a torque rotational-speed diagram of an internal-combustion engine operated by means of an embodiment of the process according to the present invention.

The result of this advancing of the shifting signal is illustrated for an arbitrary driving position in FIG. 3. The rotational shifting speed NS is advanced to the optimal rotational shifting speed NO. The actual course of the torque is again shown by arrows along curves LF and LS. It is demonstrated that, although in the time interval DT or the range of the rotational differential speed DN, there is a slight deviation from the maximal possible torque MD. This deviation, however, is much less than the mismatching according to FIG. 2 and also takes place in a lower rotational speed range and thus at a lower power of the internal-combustion engine 1. Thus, a slight mismatching does not have such a dramatic effect.

When the engine oil temperature TO is low, the control element 5 requires a longer time interval DT in order to carry out the turning operation. In this event, the values of the rotational differential speed DN are read out of the characteristic diagram K by the characteristic curve KN. This curve KN is steeper than curve KH and therefore assigns a higher value DN to a value dn/dt so that the turning operation is initiated sufficiently early.

Several characteristic diagrams K may be stored in the control unit 4, for example, in order to assign to each individual driving position G1 to G5 a separate characteristic diagram K and/or in order to assign separate rotational differential speeds DN to various load positions which are below the full load. Furthermore, several rotational shifting speeds NS or groups of rotational shifting speeds NS may be stored in order to, for example, at a lower rotational speed n, shift from a slight to a large valve crossover and/or in order to select different rotational shifting speeds NS as a function of a driving program to be determined by the vehicle driver. In this case, the rotational shifting speeds NS and the rotational differential speeds DN may, for example, be laid out in an economy driving program for the lowest fuel consumption and in a sport driving program for the highest power or torque. The switch for the selection of the driving program in this case may be the driving program switch which already exists in many motor vehicles and acts upon the transmission.

An embodiment of an arrangement for carrying out this process is shown schematically in FIG. 5. In the electronic control unit 4, a memory file 7 has stored within it several characteristic diagrams K as well as a list 8 with several rotational shifting speeds NS. The differentiator 6 forms the quotient dn/dt either using a rotational speed signal N of the internal-combustion engine 1 or using an electric signal US/UB from an air mass sensor 9 and a signal DK corresponding to the position of a throttle valve 10. (The calculation of dn/dt from the air mass and the position of the throttle valve is well known). Furthermore, the control unit 4 processes at least the engine oil temperature TO by means of which the characteristic curves KH or KN are selected in the characteristic diagrams K of the memory file 7. The rotational differential speed DN selected from the memory file 7 is overlaid on the rotational shifting speed NS written in list 8, and finally, the control unit 4 triggers a shifting signal which acts on an energy accumulator 11 which then acts upon the shifting element 5 via pressure oil as a result of this signal.

The rotational shifting speeds NS selected from list 8 can be influenced by a driving program switch 12 which can act upon a transmission 13 assigned to the internal-combustion machine 1.

If the shifting element 5 carries out the turning operation of the camshaft 3 purely electrically, so that there is no longer a dependence on the engine oil temperature TO, then the energy accumulator 11 may, for example, be an alternator/generator of the internal-combustion engine 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A process for influencing the timing periods of an internal-combustion engine that has at least one intake valve and one exhaust valve used for a charge cycle, with the timing of the intake valve with respect to the exhaust valve being changeable by means of a shifting element controlled by an electronic control unit for at least one rotational shifting speed stored in the control unit, comprising:
displacing the rotational shifting speed to the value of an optimal rotational shifting speed that results in an optimal torque, said displacing being performed as a function of the time variation of the rotational speed of the internal-combustion engine by a rotational differential speed stored in at least one characteristic diagram of the control unit.

2. A process according to claim 1, wherein the value of the optimal rotational shifting speed is smaller than the value of the rotational shifting speed.

3. A process according to claim 2, wherein the value of the rotational differential speed rises with an increasingly rapid time variation of the rotational speed, such that $DN = k \cdot dn/dt$ (k = constant).

4. A process according to claim 3, wherein the characteristic diagram stored in the control unit has at least one characteristic curve for full-load operation of the internal-combustion engine.

5. A process according to claim 4, wherein the characteristic diagram stored in the control unit has at least one characteristic curve for the operation of the internal-combustion engine at a low engine oil temperature.

6. A process according to claim 5, wherein a memory file comprising several characteristic diagrams is stored in the control unit.

7. A process according to claim 6, wherein each characteristic diagram is assigned to a driving position of a transmission which is part of the internal-combustion engine.

8. A process according to claim 7, wherein several rotational shifting speeds or groups of rotational shifting speeds are stored in a list in the control unit.

9. A process according to claim 8, further comprising selecting a rotational shifting speed from the list as a function of a position of a driving program switch.

10. A process according to claim 9, further comprising forming in a differentiator of the control unit on the basis of a rotational speed signal of the internal-combustion engine the time variation of the rotational speed in the form of a quotient.

11. A process according to claim 10, further comprising forming in a differentiator of the control unit on the basis of an electrical signal of an air mass sensor and a signal corresponding to the position of a throttle valve the time variation of the rotational speed in the form of a quotient.

12. An arrangement for influencing the timing periods of an internal-combustion engine that has at least one intake valve and one exhaust valve used for a charge cycle, comprising:
an electronic control unit having at least one rotational speed stored in the control unit;
a shifting element controlled by the electronic control unit that changes the timing of the intake valve with respect to the exhaust valve for the at least one rotational shifting speed stored in the control unit;
means for displacing the rotational shifting speed to the value of an optimal rotational shifting speed that results in an optimal torque, said means for displacing operating to displace the rotational shifting speed as a function of the time variation of the rotational speed of the internal-combustion engine by a rotational differential speed stored in at least one characteristic diagram of the control unit; and camshafts assigned to the intake and exhaust valves of the internal-combustion engine, wherein the shifting element is arranged coaxially adjacent to one of said camshafts.

13. An arrangement according to claim 12, wherein the shifting element is hydraulically operable.

14. An arrangement according to claim 12, wherein the shifting element is electrically operable.

15. An arrangement according to claim 12, wherein the shifting element includes means for changing a rotational position of the camshaft relative to a second camshaft.

16. A process according to claim 1, wherein the value of the rotational differential speed rises with an increasingly rapid time variation of the rotational speed, such that $DN = k \cdot dn/dt$ (k = constant).

17. A process according to claim wherein the characteristic diagram stored in the control unit.. has at least one characteristic curve for full-load operation of the internal-combustion engine.

18. A process according to claim 1, wherein the characteristic diagram stored in the control unit has at least one characteristic curve for the operation of the internal-combustion engine at a low engine oil temperature.

19. A process according to claim 1, wherein a memory file comprising several characteristic diagrams is stored in the control unit.

20. A process according to claim 1, wherein each characteristic diagram is assigned to a driving position of a transmission which is part of the internal-combustion engine.

21. A process according to claim wherein several rotational shifting speeds or groups of rotational shifting speeds are stored in a list in the control unit.

22. A process according to claim 1, further comprising selecting a rotational shifting speed from the list as a function of a position of a driving program switch.

23. A process according to claim 1, further comprising forming in a differentiator of the control unit on the basis of a rotational speed signal of the internal-combustion engine the time variation of the rotational speed in the form of a quotient.

24. A process according to claim 1, further comprising forming in a differentiator of the control unit on the basis of an electrical signal of an air mass sensor and a signal corresponding to the position of a throttle valve the time variation of the rotational speed in the form of a quotient.

* * * * *